W. FAAS.
UNIVERSAL LEVEL.
APPLICATION FILED MAR. 23, 1918.
1,312,527.
Patented Aug. 12, 1919.
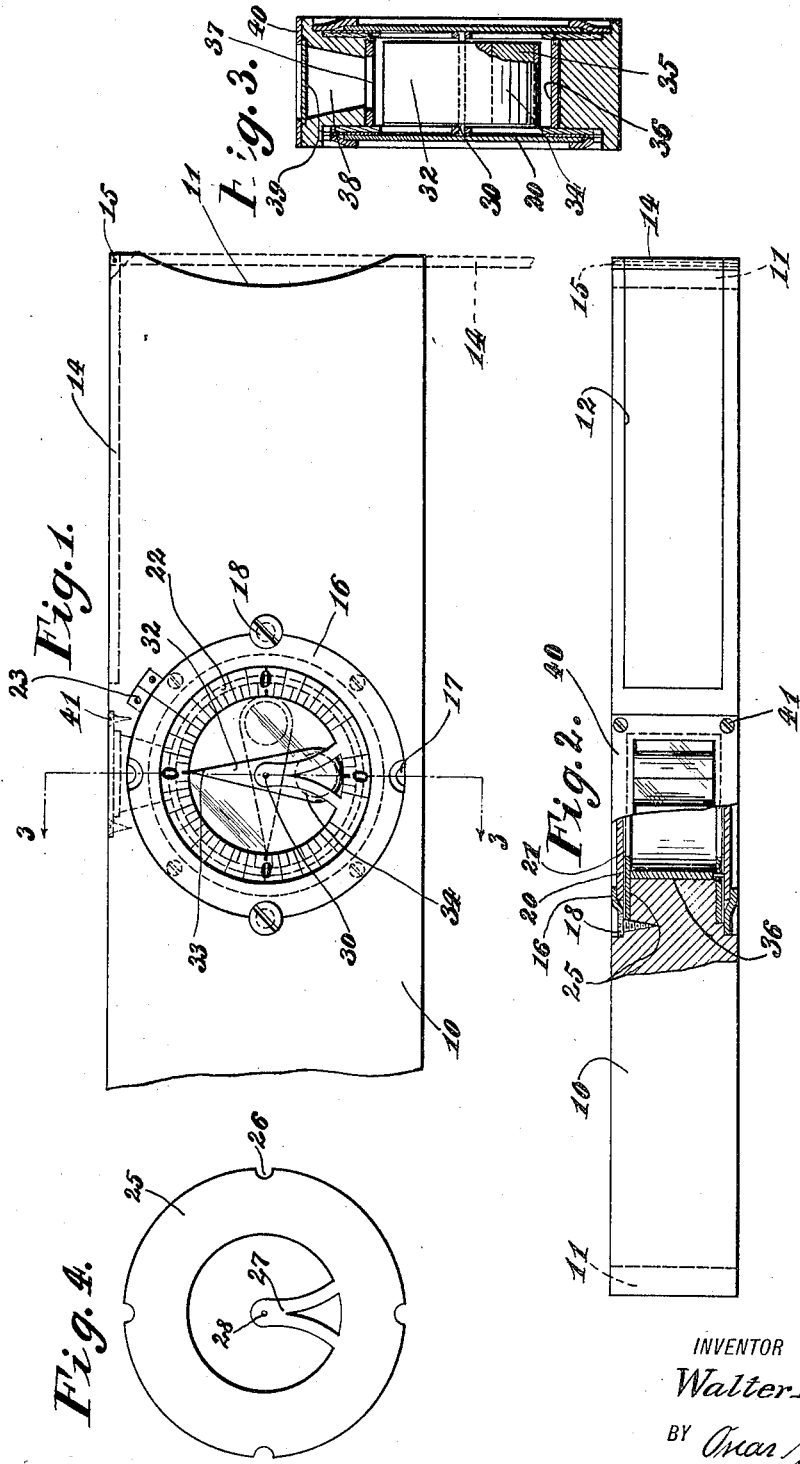
INVENTOR
Walter Faas
BY Onan Geier
HIS ATTORNEY

UNITED STATES PATENT OFFICE.

WALTER FAAS, OF FORT DOUGLAS, UTAH.

UNIVERSAL LEVEL.

1,312,527. Specification of Letters Patent. Patented Aug. 12, 1919.

Application filed March 23, 1918. Serial No. 224,146.

*To all whom it may concern:*

Be it known that I, WALTER FAAS, a citizen of the United States, resident of Fort Douglas, county of Salt Lake, and State of Utah, have invented certain new and useful Improvements in Universal Levels, of which the following is a specification.

This invention relates to improvements in levels of the type used by carpenters, masons and the like.

The principal object of the invention is to provide a level which may be used on one of its lateral edges or which may be used as a plumb with equal facility.

A further object is to make use of a weighted index finger whereby the operation is attained by the force of gravity and not by a liquid which may be frozen or its containing vial broken.

These and other like objects are attained by the novel construction and combination of parts hereinafter described, and shown in the accompanying drawings, forming a material part of this inclosure, and in which—

Figure 1 is a fragmental side elevation view of a level made in accordance with the invention.

Fig. 2 is a top plan view of the same, parts being broken away in order to show the interior construction.

Fig. 3 is a transverse sectional view taken on line 3—3 of Fig. 1, and

Fig. 4 is a side elevational view of the index finger-supporting means.

In the drawings, the numeral 10 is appended to the body of the level, which is of the usual shape having an oblong rectangular body, the sides and edges of which are parallel. The ends of the level are recessed as at 11, one of the edges adjacent to the ends being recessed, as at 12, and having fitted to it a plate 14, hingedly engaged by the pin 15, the purpose being so that it can be extended across the end of the level as shown in Fig. 1, thereby providing an enlarged footing as indicated.

Formed through the body of the level is a round opening, in the recessed margin of which are secured rings 16, having at four oppositely disposed points, recesses 17 engageable of the screw heads 18, by means of which the rings are secured to the body of the level. Clamped by the rings 16 are transparent plates 20, below which are fixed rings 21 having impressed upon them a plurality of index graduations 22, which can be seen through the transparent plate 20 and which are placed in proper operative relation by means of a line inscribed upon a small fixed plate 23, set flush with the level body, and below the celluloid plates 21 are metallic rings 25, having marginal recesses 26, through which the screws 18 pass.

Formed in the rings 25 are central openings into which extend integral brackets 27 containing perforations 28, in which is journaled the spindle 30, upon which is mounted the index finger 32, having a sharp wedge shaped point 33, the opposite enlarged end 34 being receptive of a weight plug 35, as of lead or the like, so as to render the instrument sensitive.

Inclosed within the recess formed within the body is a metallic sleeve 36 having an opening 37, alined with the passage 38 formed in the top of the level and which is covered by a transparent plate 39, held in position by a clamp plate 40, secured by screws 41 in an obvious manner.

In operation, the parts having been assembled as indicated, and it is desired to use the same to indicate horizontals, the parts will be positioned as indicated in Fig. 1, and if the work to which the instrument is applied be horizontal, the wedged edge 33, of the finger will register with the zero which can be seen either by looking sidewise through the top of the implement or through the sides thereof if it is desired to use the instrument as a plumb, that is vertically, the screws 18 are slackened so as to turn the plates 16, and when in their relocated position the index can be observed through the level in the manner indicated.

Having thus described my invention what I claim as new and desire to secure by Letters Patent, is—

In a level, the combination with an elongated rectangular body having parallel sides and edges and having an opening formed centrally through the sides, plates fitted to said openings, means for clamping said plates in either of two positions adjacent to said openings, transparent plates clamped by the first named plates, celluloid annular indexes below said transparent plates, a pair of annular support plates adjacent to said transparent plates, said support plates having perforated lugs extending into the openings in the plates, a ring in said opening against which said support plates are seated, a spindle journaled in the mentioned lugs and an index finger rigid with said spindle, said finger having a sharp angular edge at one end and containing a weight whereby said finger is caused to rotate according to the inclination of said body.

In testimony whereof I have affixed my signature.

WALTER FAAS.

Copies of this patent may be obtained for five cents each, by addressing the "Commissioner of Patents, Washington, D. C."